United States Patent [19]

Wierschem

[11] Patent Number: 4,773,674
[45] Date of Patent: Sep. 27, 1988

[54] HOLDING ARRANGEMENT FOR A STEERING COLUMN OF A MOTOR VEHICLE

[75] Inventor: Franz-Rudolf Wierschem, Weissach, Fed. Rep. of Germany

[73] Assignee: Dr. Ing. h.c.F. Porsche Aktiengesellschaft, Stuttgart, Fed. Rep. of Germany

[21] Appl. No.: 69,221

[22] Filed: Jul. 2, 1987

[30] Foreign Application Priority Data

Jul. 11, 1986 [DE] Fed. Rep. of Germany ....... 3623414

[51] Int. Cl.⁴ .................... B60R 21/05; B60R 21/055
[52] U.S. Cl. .................................... 280/777; 180/90; 280/732
[58] Field of Search ............... 280/777, 778, 779, 731, 280/728; 180/90, 271; 296/70, 73

[56] References Cited

U.S. PATENT DOCUMENTS

| | | | |
|---|---|---|---|
| 3,768,830 | 10/1973 | Hass | 280/732 |
| 3,938,821 | 2/1976 | Hass | 280/777 |
| 3,944,244 | 3/1976 | Albrecht | 280/777 |
| 3,951,427 | 4/1976 | Wilfert | 280/732 |
| 4,097,064 | 6/1978 | Ikawa | 280/732 |
| 4,337,967 | 7/1982 | Yoshida et al. | 280/777 |
| 4,360,223 | 11/1982 | Kirchoff | 280/732 |

FOREIGN PATENT DOCUMENTS 2143935  3/1973  Fed. Rep. of Germany .
2623521  7/1980  Fed. Rep. of Germany .

*Primary Examiner*—Richard A. Bertsch
*Attorney, Agent, or Firm*—Barnes & Thornburg

[57] ABSTRACT

A holding arrangement for a steering column of a motor vehicle, particularly for a steering column having a steering wheel with an air bag, is disclosed which has an energy-absorbing carrier bracket arranged between the body of the vehicle and a steering protection tube, the carrier bracket being connected with a steering column protection tube. The carrier bracket is equipped with deformation sections and is arranged above the steering protection tube. Below the steering protection tube, a knee catching device is provided that comprises a rigid force transmitting element that is arranged opposite the carrier bracket and in a force-transmitting way is connected with the steering protection tube. The movement of the steering column that takes place in the case of an impact is supported by longitudinal forces introduced into the steering wheel—while absorbing energy in the deformation sections—via vertical forces introduced via the force-transmitting element.

13 Claims, 8 Drawing Sheets

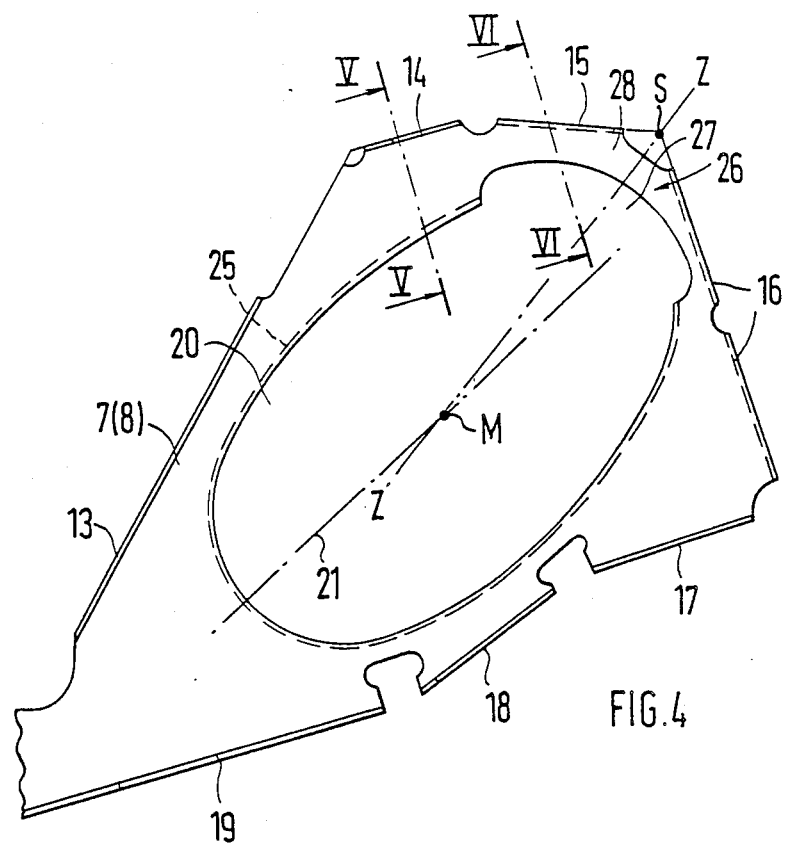
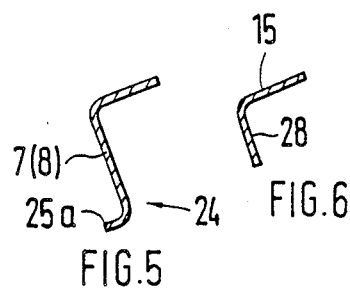
FIG.4
FIG.5 FIG.6

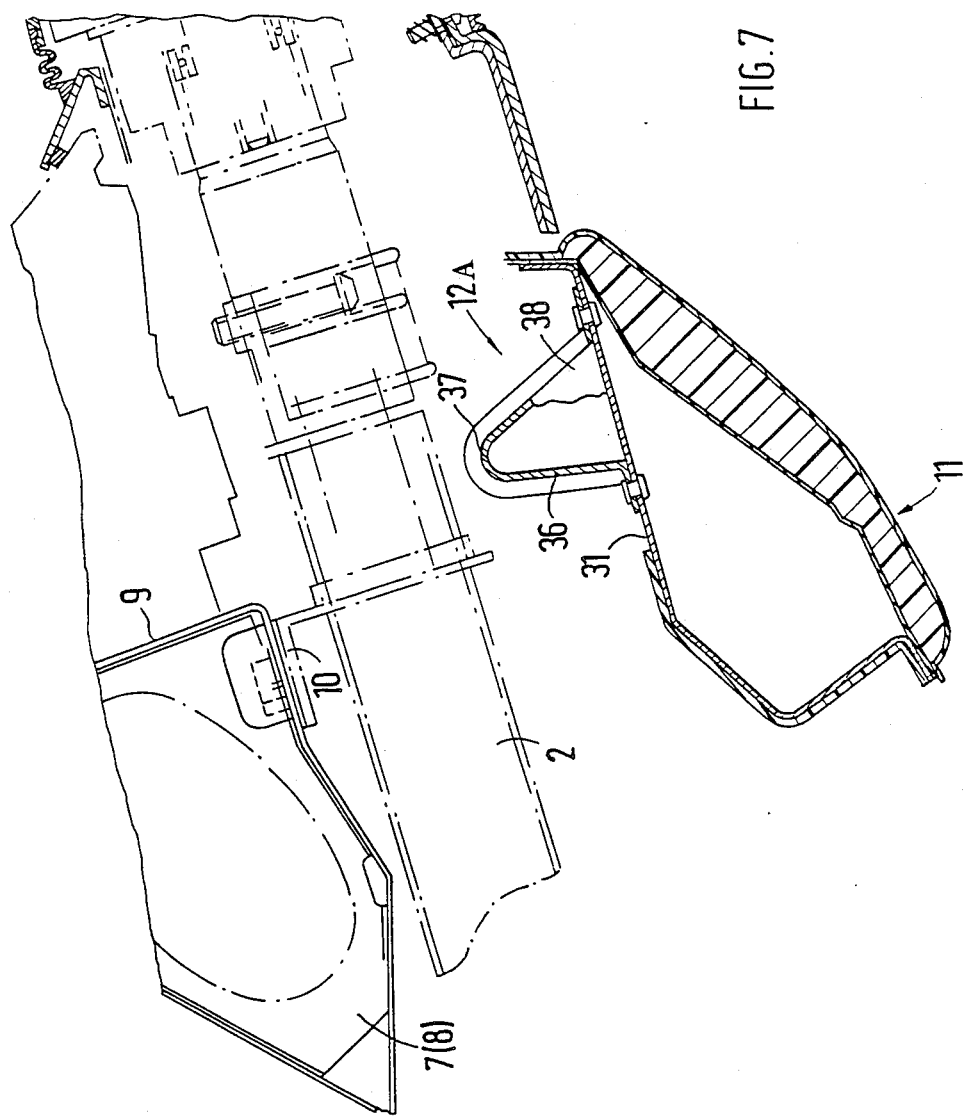

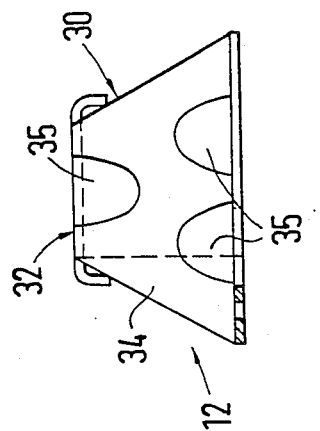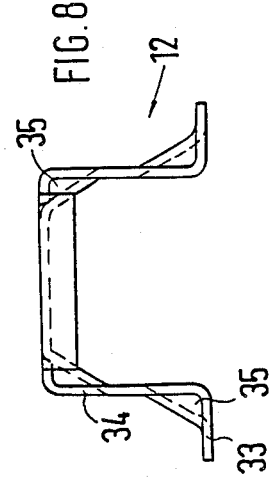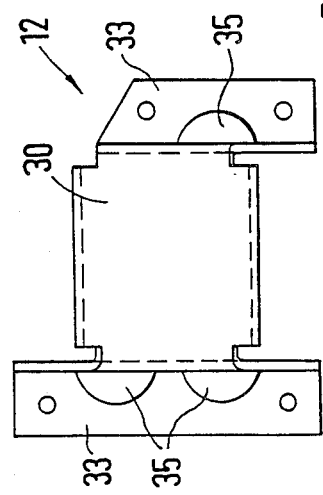

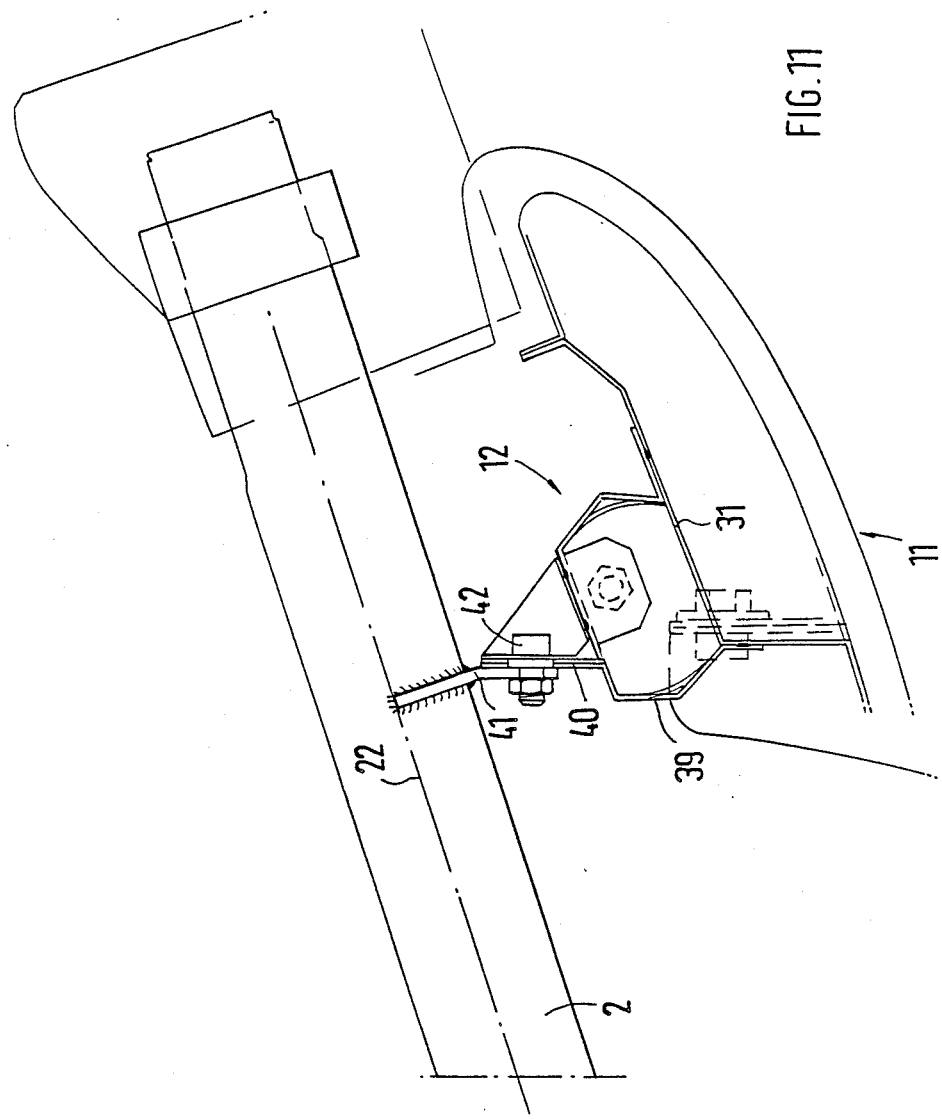

HOLDING ARRANGEMENT FOR A STEERING COLUMN OF A MOTOR VEHICLE

BACKGROUND AND SUMMARY OF THE INVENTION

The invention relates to a holding arrangement for a steering column of a motor vehicle. The preferred embodiments relate to holding arrangements with a steering column supporting a steering wheel and an air bag therein.

In the case of a collision that severely decelerates the vehicle, the driver is thrown forward at a high relative speed with respect to the vehicle and impacts against the steering wheel. Now the kinetic energy that is generated during the forward motion of mainly the upper part of the driver's body is to be absorbed by a plastic deformation while energy is absorbed in the steering system and as a result an injury to the driver is to be largely eliminated. From German Patent (DE-PS) 26 23 521, a cylindrical deformation element having recesses arranged in the steering column has become known that permits this type of energy absorption. In the case of a steering system with an air bag arranged in the steering wheel, it is, because of the space in the steering wheel that is required for this purpose, no longer possible to install this deformation element.

In order to achieve an effect that essentially corresponds to that using a cylindrical deformation element, it is known from German Patent (DE-PS) 21 43 935 to connect the steering protection tube surrounding the steering column via a supporting bracket with the vehicle body, in which case this supporting bracket is developed as an energy-absorbing deformation element and has a weakened area developed as the deforming element, said weakened area being located in a horizontal approximately parallel plane that is arranged with respect to the impinging force. By means of this type of development of the supporting bracket, essentially only a deformation in the direction of the impact force is possible, whereas no yielding adjustment of the steering column in vertical direction is achieved. In addition, this type of known supporting bracket with the weakened area in the horizontal plane has a desired softness that does not make it possible to ensure a suppression of a trembling of the steering wheel in the driving operation.

An objective of the invention is to provide a holding arrangement for a steering system that has a targeted softness for a deformation in the case of an impact and at the same time a stiffness that is as extensive as possible for a bearing of the steering system that is free from vibrations.

According to the invention, this objective is achieved by providing a carrier bracket with deformation sections supporting one side of the steering column protection tube and a knee support arrangement engaging the other side of the protection tube.

The main advantages achieved by means of the invention are that a relatively stiff holding arrangement for the steering system at the same time serves as the only deformation element in the steering system and ensures sufficient energy absorption in the case of an impact. Because of the special position of the deformation sections at a narrow side of the openings in the lateral parts, only an insufficient deformation of the supporting bracket and thus no sufficiently effective energy absorption can be achieved by means of the longitudinally directed impact force and by means of a vertical component with respect to it alone, particularly since a bearing sheet connected with the steering protection tube acts as the stiffening element.

In order to achieve an optimized energy absorption, the longitudinal force that is introduced via the steering wheel is supplemented by an additional vertical force that is introduced into the steering protection tube via a knee catching device and a support. This force is generated when the driver's knees impact at the knee catching device that is cushioned on the outside but via which nevertheless a force component via the support is introduced into the steering protection tube. This force component preferably affects the protection tube at a position in front of the supporting bracket with respect to the steering wheel so that an upward-swivelling motion of the steering column and a deformation of the supporting bracket that is adapted to the conditions can be achieved.

Advantageously, the support may either be rigidly connected with the steering protection tube or the support is arranged at a distance to the steering protection tube, according to certain preferred embodiments. In addition, it is also contemplated to fasten the support at the steering protection tube, in which case, it would then be located at a distance opposite a carrying means of the knee catching device according to certain preferred embodiments.

Other objects, advantages and novel features of the present invention will become apparent from the following detailed description of the invention when considered in conjunction with the accompanying drawings.

BRIEF DESCRIPTION OF THE DRAWINGS

FIG. 4 is an enlarged schematic lateral view of a lateral part of the holding arrangement of FIGS. 1-3;

FIG. 5 is a sectional view taken along the Line V—V of FIG. 4 through a bent edge border region of the oval-shaped opening;

FIG. 6 is a sectional view taken along the Line VI-VI of FIG. 4 through the edge border region in the area of the deformation section;

FIG. 7 is a partial lateral, partially sectional schematic view of a holding arrangement constructed according to another preferred embodiment of the invention, with a triangular support;

FIGS. 8 to 10 are respective schematic lateral, front and top views of a support used in the embodiment of FIG. 1;

FIG. 11 is a lateral view of yet another embodiment of a support;

DETAILED DESCRIPTION OF THE DRAWINGS

Figure 1:
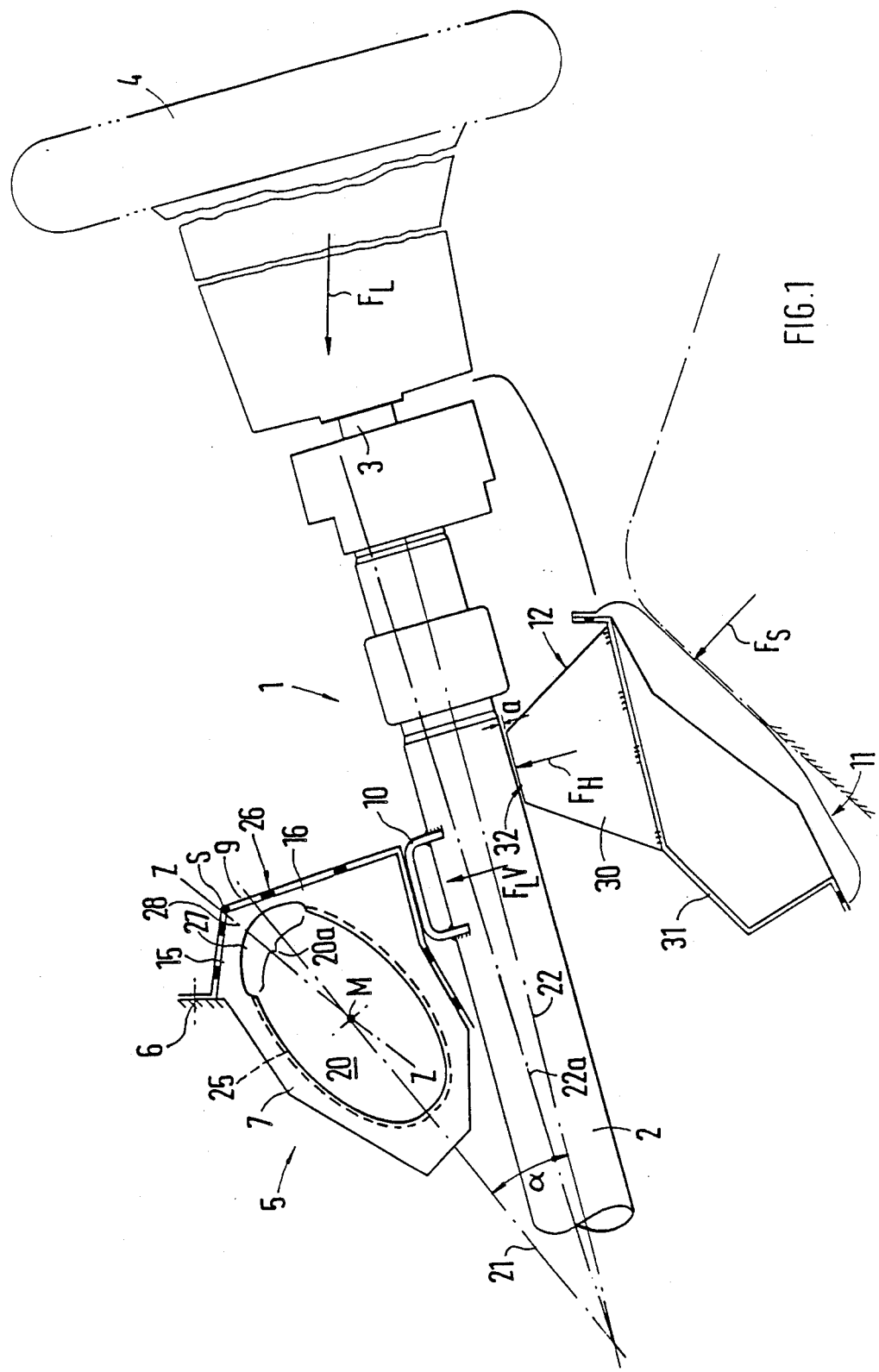
FIG. 1 is a partial schematic side view of a holding arrangement for the steering system, also showing the occurring forces during an impact, in an arrangement constructed in accordance with a preferred embodiment of the invention.
Figure 2:
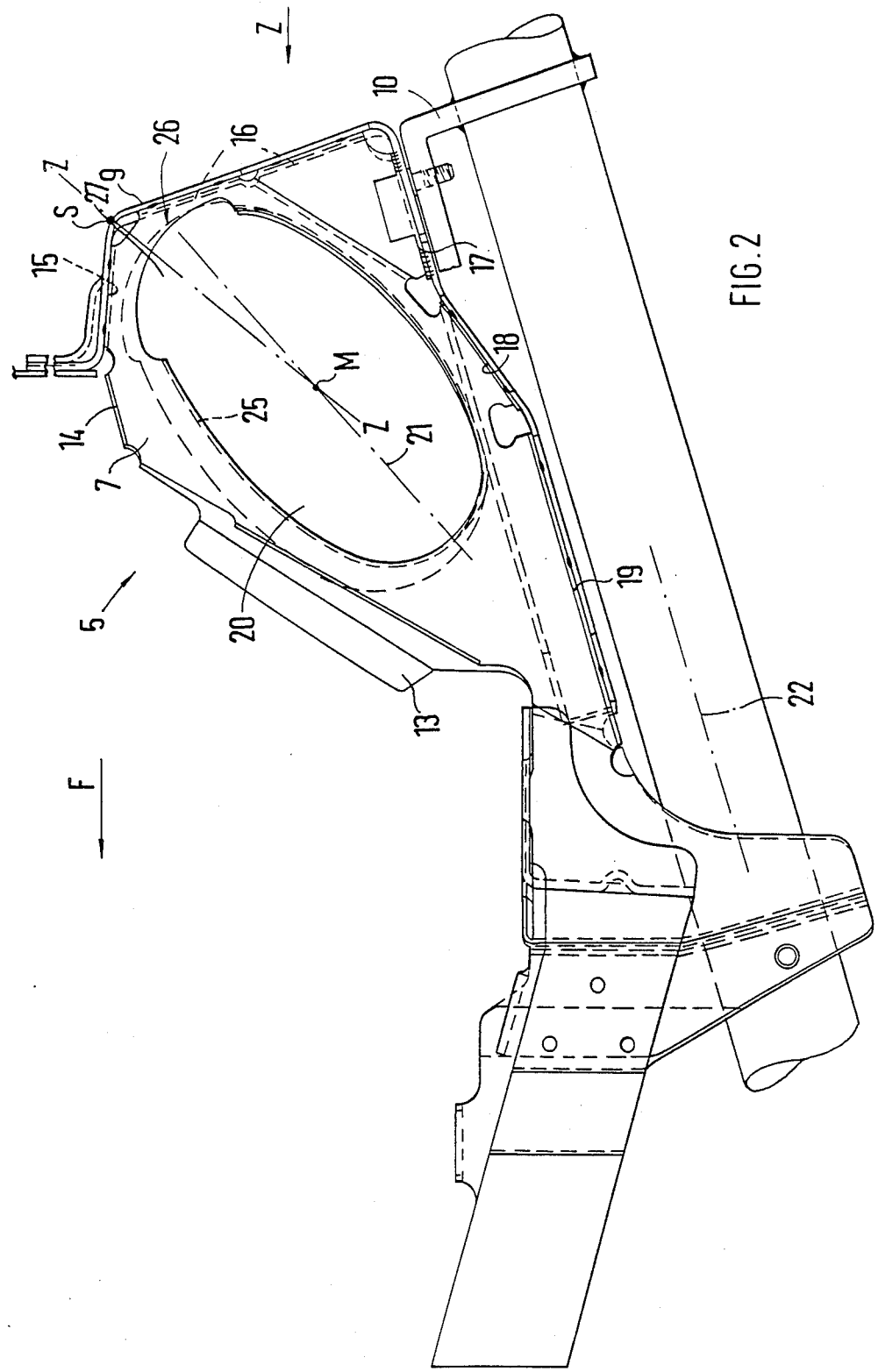
FIG. 2 is a lateral enlarged schematic view of the holding arrangement of FIG. 1.
Figure 3:
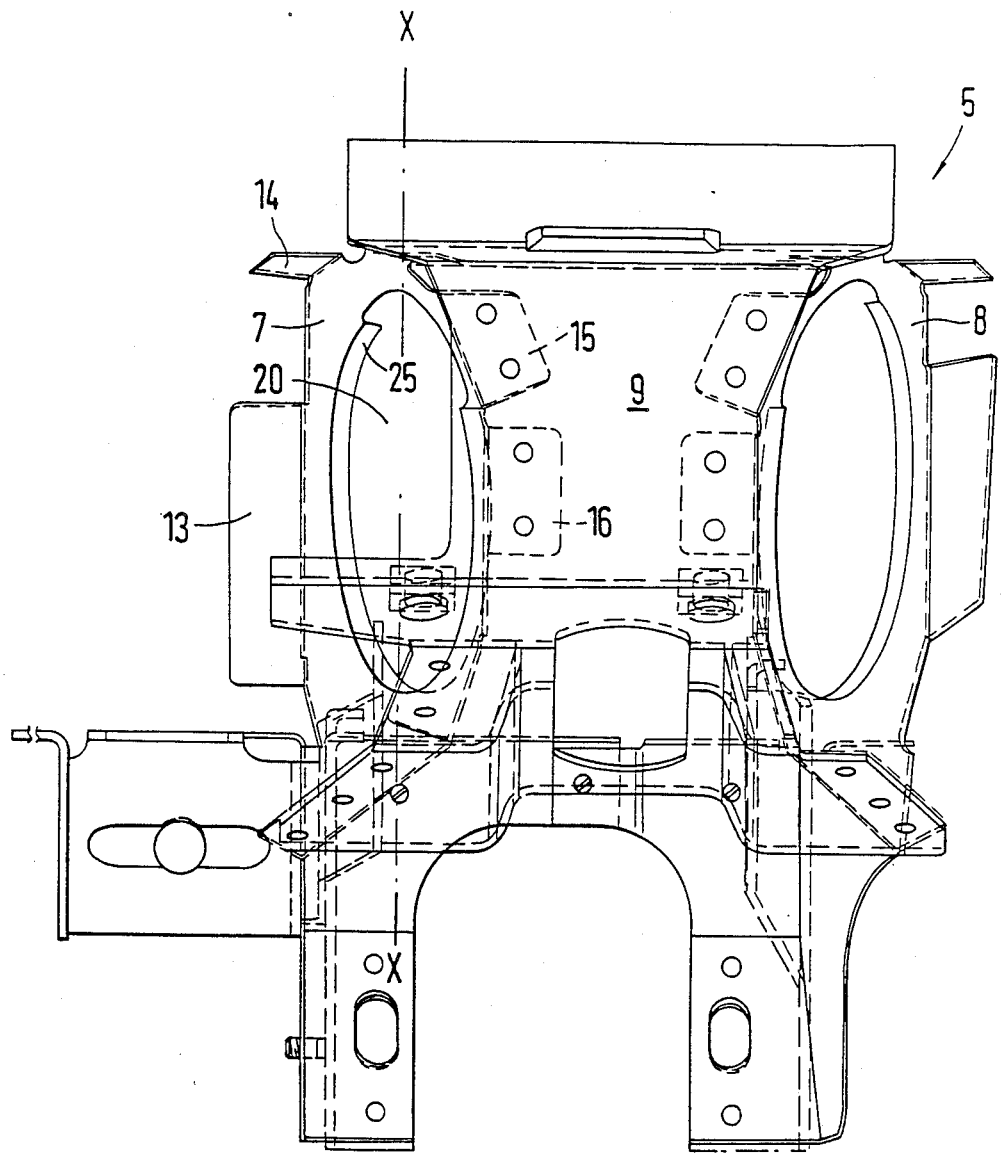
FIG. 3 is a view of the holding arrangement seen in the direction of the Arrow Z of FIG. 2.

The steering system 1 comprises essentially a steering protection tube 2 in which steering column 3 is disposed and with which a steering wheel 4 is connected. Via a holding arrangement 5, the steering system 1 is connected at the body 6 of the vehicle. An air bag is arranged in the steering wheel 4 that, in the case of an impact, is filled with air and catches the driver's upper body and head.

The holding arrangement 5 comprises a carrier bracket that is formed of two lateral parts 7 and 8 as well as a bearing sheet 9. The carrier bracket acts as a deformation element and is connected via a bearing block 10 or the like with the steering protection tube 2. The holding arrangement 5 is arranged above the steering protection tube 2, in which case a knee catching device 11 having an integrated energy transmission element 12 is provided below the steering protection tube 2.

The lateral parts 7 and 8 comprise shaped sheet metal parts that are arranged symmetrically at both sides of the steering column 3 in vertical longitudinal planes X—X and extend in driving direction F. Lateral parts 7, 8 have holding legs 13, 14 for the connection with the body 6 of the vehicle as well as additional holding legs 15, 16, 17, 18, 19 for the connection with the overlapping bearing sheet 9.

Oval-shaped openings 20 are formed in the lateral parts 7, 8, the longitudinal central axis 21 of which opening 20 extends at an acute angle α with respect to the central axis 22 of the steering column 3. The border edge 25 of the opening 20 is formed as an angle section 24 with one leg 25a (FIGS. 4 and 5). In a forward area that faces toward the steering wheel 4, an arched recess 27 is carved out at one narrow side 26 of the opening 20 that is extended beyond the normal oval course of the opening 20. This recess 27 is formed to be weakened with respect to the remaining border edge 25 of the opening and forms a deformation section 20a. The leg 25a of the profile 24 is cut away for the purpose of obtaining the weakening in this recess 27 so that in this area only the flat base sheet 28 will remain which extends into the holding legs 15 and 16. The recess 27 extends at a relatively short distance to the holding legs 15 and 16 that define the recess 27 in a roof-shaped way and are arranged approximately symmetrically with respect to a plane Z—Z extending through the vertex S of the legs 15, 16 and the center M of the opening 20. This weakened area forms the deformation zone in which the carrier bracket in a defined way can be plastically compressed in the case of an impact while absorbing energy.

Since the lateral parts 7 and 8 can essentially deform only in vertical direction, the element 12 that is connected with the knee catching device 11 is arranged below the steering protection tube 2 and in an energy-transmitting way is connected with the steering Protection tube 2. A movement of the steering column 3 that is caused by the longitudinal force $F_L$ during the impact of the upper body on the steering wheel 4, is supported via the diagonal force $F_S$ from the driver's knees onto the the knee catching device 11 and the corresponding vertical force component $F_H$ so that an optimized deformation of the lateral parts 7, 8 takes place.

The energy transmission element 12, 12A, 12B, 12C is either fixedly connected with the steering protection tube 2 (FIGS. 11 and 12) or is arranged at a narrow distance from the steering protection tube 2 (FIGS. 1 and 7 to 10).

Element 12 that is developed according to FIG. 1 as well as FIGS. 8 to 10 comprises a box-shaped support block 30 that is fastened at the carrier means 31 of the knee catching device 11. This block 30 has a flat pressure surface 32 that faces the steering protection tube 2 and supports itself with respect to the carrier means 31 via lateral surfaces 34 ending in the legs 33. In the transition area from the pressure surface 32 to the lateral surfaces 34 as well as from these to the legs 33, indentations or pressured-out areas 35 are provided.

In a further development according to FIG. 7, element 12A comprises a triangular profile 36, the apex 37 of which faces the steering protection tube 2 and which at the end sides is closed via walls 38.

In a further embodiment according to FIG. 11, the element 12B comprises a box-shaped support block 39 composed of profiles that includes a projecting leg 40 facing the steering protection tube 2, said leg 40 being detachably connected via a screw 42 with a fixed leg 41 of the steering protection tube 2, said screw 42 at the same time permitting an adjustment.

Figure 12:
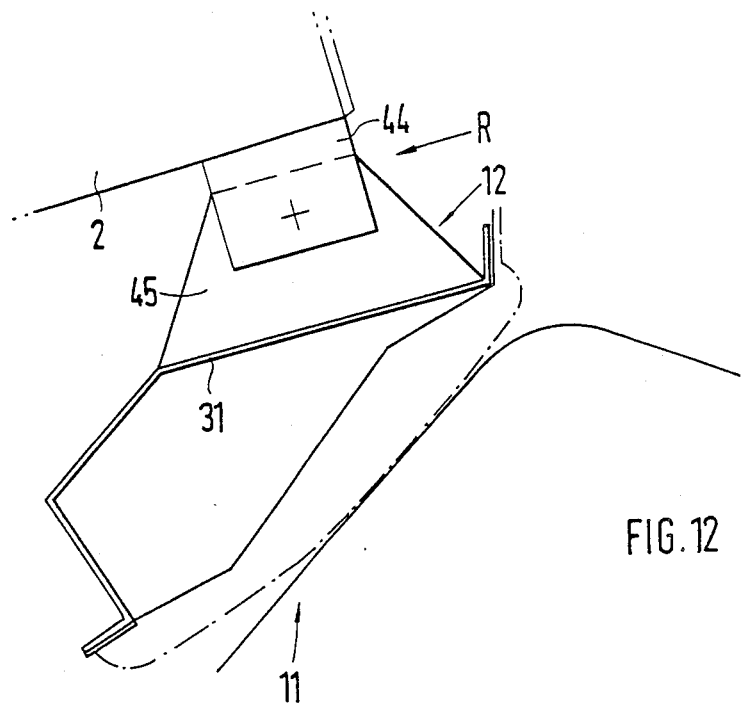
FIG. 12 is another embodiment of a support that is rigidly connected with the steering protection tube.
Figure 13:
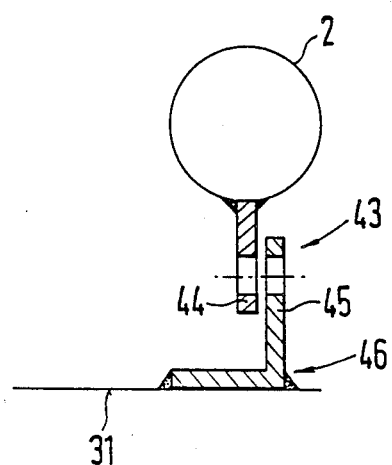
FIG. 13 a view of the support according to FIG. 12 seen in the direction of the Arrow R.

Another embodiment of a support block 43 is shown in FIGS. 12 and 13. Energy transmission element arrangement 12C includes a first leg 44 that is rigidly connected with the steering protection tube 2, the leg 44 being detachably connected with another leg 45 of an angle section 46 which is rigidly fastened at the carrier profile 31.

When the upper body of the driver impacts on the steering wheel 4 or on the air bag of the air bag system, the driver's knees are at the same time pressed against the knee catching device 11. The longitudinal force $F_L$ introduced by the upper body into the steering system, as well as the resulting vertical force component $F_LV$, is supported by the diagonal force $F_S$ and the resulting force component $F_H$. This force component $F_H$, because of the position of element 12 (12A, 12B, 12C) in front of the holding arrangement 5 with respect to the steering wheel 4, is introduced into the steering protection tube 2 in such a way that a swivelling-up of the steering system takes place and it takes up, for example, the position according to the axis 22a (FIG. 1). Because of this adjustment in vertical direction, a deformation of the carrier bracket and of the lateral parts 7 and 8 as well as of the bearing sheet 9 takes place as a function of the intensity of the impact.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A holding arrangement for a steering column of a motor vehicle of the type having a steering column protection tube, comprising:
    energy-absorbing carrier bracket means arranged between a vehicle body and the steering protection tube, said carrier bracket means being connected with the steering protection tube and having deformation sections, and
    knee catching device means fastened at the vehicle body and arranged below the steering protection tube, wherein the knee catching device means comprises a force-transmitting element that is arranged opposite the carrier bracket means and is connected with the steering protection tube in a force-transmitting way such that during an impact a movement of the steering column is accomplished by longitudinal forces introduced into the steering wheel in combination with vertical forces introduced into the force-transmitting element through the knee catching device resulting in the absorption of energy in the deformation sections at the carrier bracket means.

2. A holding arrangement according to claim 1, wherein the carrier bracket means comprises lateral parts that are arranged at both sides of the steering column and are connected with one another via a bearing sheet, said lateral parts being held at the vehicle body and extending in vertical longitudinal planes in driving direction, and wherein the lateral parts are provided with oval-shaped openings, the border regions of said oval-shaped openings having deformation sections at respective forward narrow sides facing the steering wheel.

3. A holding arrangement according to claim 2, wherein the border regions of the deformation sections are developed to be weakened in the lateral parts as compared to the connecting border regions of the oval-shaped openings which exhibit an angle section.

4. An arrangement according to claim 3, wherein the deformation sections are formed by arched recesses at the narrow sides of the oval-shaped openings which are extended outside the course of the oval-shaped form and extend at a relatively narrow distance to limiting holding legs of the lateral parts.

5. An arrangement according to claim 4, wherein the two holding legs are placed at an angle in a roof-shaped way and the arched recesses are arranged approximately symmetrically with respect to a plane extending through a vertex of the holding legs and a center of the oval-shaped openings.

6. An arrangement according to claim 1, wherein the force-transmitting element includes a box-shaped supporting block that is held at a transversely extending carrier means of the knee catching device and is arranged in a plane between lateral parts of the carrier bracket means and is located opposite the steering protection tube at a relatively narrow distance.

7. An arrangement according to claim 6, wherein the supporting block has a flat pressure surface facing the steering protection tube, said pressure surface supporting itself in the direction of the knee catching device via lateral surfaces ending in legs, and in the transition area from the pressure surface to the lateral surfaces as well as from these to the legs has indentations and pressed-out areas.

8. An arrangement according to claim 1, wherein the force-transmitting element includes a supporting block, which in its cross-section, comprises a triangular profile, the apex of which faces the steering protection tube and the end sides of which are closed via walls.

9. An arrangement according to claim 1, wherein a carrier means of the knee catching device is connected with a box-shaped supporting block that is fastened at the steering protection tube, said supporting block comprising a projecting leg facing the steering protection tube, said leg being detachably connected with fixed leg of the steering protection tube.

10. An arrangement according to claim 1, wherein an angle section is detachably connected with a fixed leg of the steering protection tube, said angle section being held at a carrier means of the knee-catching device.

11. An arrangement according to claim 1, wherein the force-transmitting element—with respect to the steering wheel—is arranged in front of the carrier bracket means, in such a manner that the force component of the vertical force, under a lever arm with respect to the carrier bracket means, is introduced into the steering column.

12. An arrangement according to claim 1, wherein the force-transmitting element is rigid.

13. An arrangement according to claim 1, wherein the steering column includes a steering wheel with an air bag.

* * * * *